(12) United States Patent
Li et al.

(10) Patent No.: US 10,078,251 B2
(45) Date of Patent: Sep. 18, 2018

(54) ARRAY SUBSTRATE AND DISPLAY APPARATUS

(71) Applicant: BOE TECHNOLOGY GROUP CO., LTD., Beijing (CN)

(72) Inventors: Wenbo Li, Beijing (CN); Pan Li, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 14 days.

(21) Appl. No.: 15/308,400

(22) PCT Filed: Nov. 2, 2015

(86) PCT No.: PCT/CN2015/093562
§ 371 (c)(1),
(2) Date: Nov. 2, 2016

(87) PCT Pub. No.: WO2016/188036
PCT Pub. Date: Dec. 1, 2016

(65) Prior Publication Data
US 2017/0261801 A1  Sep. 14, 2017

(30) Foreign Application Priority Data
May 26, 2015  (CN) .................... 2015 2 0349040 U (51) Int. Cl.
*H01L 29/04*  (2006.01)
*G02F 1/1362*  (2006.01)
(Continued)

(52) U.S. Cl.
CPC ........ *G02F 1/13624* (2013.01); *G02F 1/1368* (2013.01); *G02F 1/134309* (2013.01);
(Continued)

(58) Field of Classification Search
CPC ........... G02F 2201/123; G02F 1/13624; G02F 1/134309; G02F 1/136227;
(Continued)

(56) References Cited

U.S. PATENT DOCUMENTS 6,476,787 B1   11/2002  Libsch et al.
2007/0120797 A1*  5/2007  Lin .................. G02F 1/133555
                                                                345/92
(Continued)

FOREIGN PATENT DOCUMENTS

CN   101750812 A   6/2010
CN   103744244 A   4/2014
(Continued)

OTHER PUBLICATIONS

International Search Report and Written Opinion for Application No. PCT/CN2015/093562, dated Mar. 4, 2016, 13 Pages.

*Primary Examiner* — Kevin M Picardat
(74) *Attorney, Agent, or Firm* — Brooks Kushman P.C.

(57) ABSTRACT

An array substrate and a display apparatus are provided according to embodiments of the disclosure. A pixel unit includes a first sub-pixel electrode and a second sub-pixel electrode, the first sub-pixel electrode is connected to a drain of the first TFT, and the second sub-pixel electrode is connected to a drain of the second TFT, a resistance between a source of the first TFT and the data line connected to the first TFT is greater than a resistance between a source of the second TFT and the data line connected to the second TFT, and/or, a resistance between the drain of the first TFT and the first sub-pixel electrode is greater than a resistance between the drain of the second TFT and the second sub-pixel electrode.

20 Claims, 6 Drawing Sheets

(51) Int. Cl.
*G02F 1/1368* (2006.01)
*G02F 1/1343* (2006.01)

(52) U.S. Cl.
CPC .. *G02F 1/136227* (2013.01); *G02F 1/136286* (2013.01); *G02F 2001/134345* (2013.01); *G02F 2201/123* (2013.01)

(58) Field of Classification Search
CPC ... G02F 2001/134345; G02F 1/136286; G02F 1/1368; G02F 1/13
See application file for complete search history.

(56) References Cited

U.S. PATENT DOCUMENTS

| | | | |
|---|---|---|---|
| 2009/0213286 A1 | 8/2009 | Kim et al. | |
| 2013/0077002 A1* | 3/2013 | Yoon | G02F 1/136213 349/38 |
| 2016/0349569 A1* | 12/2016 | Kim | G02F 1/134309 |
| 2016/0357043 A1* | 12/2016 | Kim | G02F 1/1354 |

FOREIGN PATENT DOCUMENTS

| | | |
|---|---|---|
| CN | 204719374 U | 10/2015 |
| JP | H0572995 A | 3/1993 |

\* cited by examiner

ARRAY SUBSTRATE AND DISPLAY APPARATUS

CROSS-REFERENCE TO RELATED APPLICATIONS

This application is the U.S. national phase of PCT Application No. PCT/CN2015/093562 filed on Nov. 2, 2015, which claims priority to Chinese Patent Application No. 201520349040.7 filed on May 26, 2015, the disclosures of which are incorporated in their entirety by reference herein.

FIELD

The disclosure relates to the field of electronics, and in particular, to an array substrate and a display apparatus.

BACKGROUND

In a liquid crystal display apparatus, liquid crystal molecules under an electric field are regularly arranged, so that the liquid crystal molecules exhibit crystal property and have optical anisotropy. Specifically, if the liquid crystal molecules are all neatly arranged in one direction, light emitted in all directions through a liquid crystal layer is different. Therefore, a macroscopic screen composed of the emitted light is also different in various viewing angles. A property of keeping a screen to be unchanged with the variation in the viewing angles is referred to as a viewing angle characteristic of the liquid crystal display apparatus. For the liquid crystal display apparatus with a poor viewing angle characteristic (that is, a viewing angle is small), problems of decreasing in contrast, black and white reversal, and chromatic aberration may arise in viewing from a large viewing angle.

However, an observer often needs to view the liquid crystal display apparatus from a large viewing angle, therefore, it is necessary to improve the viewing angle characteristic of the liquid crystal display apparatus.

SUMMARY

An array substrate and a display apparatus are provide according to the disclosure, which can improve a viewing angle of a liquid crystal display and reduce the complexity of a TFT structure within the array substrate.

To achieve the above objective, technical solutions in the disclosure are provided as follows.

An array substrate is provide according to the disclosure, which includes multiple pixel units divided by gate lines and data lines arranged crosswise. Each of the pixel units includes a first sub-pixel electrode, a second sub-pixel electrode, a first TFT, and a second TFT. The first sub-pixel electrode is connected to a drain of the first TFT, and the second sub-pixel electrode is connected to a drain of the second TFT. A resistance between a source of the first TFT and the data line connected to the first TFT is greater than a resistance between a source of the second TFT and the data line connected to the second TFT; and/or, a resistance between the drain of the first TFT and the first sub-pixel electrode is greater than a resistance between the drain of the second TFT and the second sub-pixel electrode.

Furthermore, the source of the first TFT is connected to the data line connected to the first TFT through a source line in a broken line shape, and the source of the second TFT is connected to the data line connected to the second TFT through a source line in a straight line shape; and/or, the drain of the first TFT is connected to the first sub-pixel electrode through a drain line in a broken line shape, and the drain of the second TFT is connected to the second sub-pixel electrode through a drain line in a straight line shape.

Furthermore, a first voltage dividing resistor is arranged in the source line connected to the source of the first TFT, and/or, a second voltage dividing resistor is arranged in the drain line connected to the drain of the first TFT.

Furthermore, when the first voltage dividing resistor is arranged in the source line connected to the source of the first TFT, the source line connected to the source of the first TFT includes first source segments spaced apart from each other, and the first voltage dividing resistor includes second source segments arranged in a different layer from the first source segments. The second source segments are connected to the first source segments spaced apart through via holes. The source of the second TFT is arranged in a same layer with the first source segments or the second source segments.

Furthermore, the second source segments are arranged in a same layer with the first sub-pixel electrode and/or the second sub-pixel electrode.

Optionally, when the first voltage dividing resistor is arranged in the source line connected to the source of the first TFT, the source line connected to the source of the first TFT includes a first source segment and a second source segment, and the first voltage dividing resistor includes a diode pair. One end of the diode pair is connected to the first source segment, and the other end of the diode pair is connected to the second source segment. The diode pair includes a forward diode and a backward diode connected in parallel.

Furthermore, the forward diode and the backward diode are formed by shorting a thin film transistor, respectively. The forward diode includes a first shorted source, a first shorted drain and a first gate region. The first shorted source is connected to the first source segment, the first shorted drain is connected to the second source segment, and the first gate region is shorted to the first shorted source through a via hole. The backward diode includes a second shorted source, a second shorted drain and a second gate region. The second shorted source is connected to the first source segment, the second shorted drain is connected to the second source segment, and the second gate region is shorted to the second shorted drain through a via hole.

Furthermore, the first gate region and the second gate region are arranged in a same layer with a gate of the first TFT and a gate of the second TFT, respectively.

Furthermore, via holes are respectively formed in the first gate region and the first shorted source, and the two via holes are connected by covering a transparent conducting layer on the two via holes. Via holes are respectively formed in the second gate region and the second shorted drain, and the two via holes are connected by covering a transparent conducting layer on the two via holes.

Furthermore, when the second voltage dividing resistor is arranged in the drain line connected to the drain of the first TFT, the drain line connected to the drain of the first TFT includes first drain segments spaced apart, the second voltage dividing resistor includes second drain segments arranged in a different layer from the first source segments, and the second drain segments are connected to the first drain segments spaced apart through via holes.

Furthermore, a non-penetrated groove is arranged in the gate line, an opening of the groove faces towards the first sub-pixel electrode or the second sub-pixel electrode, and the source line of the first TFT is overlapped with a gate of the TFT by passing through a bottom of the groove.

Furthermore, the groove extends in a direction from the second sub-pixel electrode to the first sub-pixel electrode and does not penetrate the gate line.

Furthermore, in one of the pixel units, the source of the first TFT and the source of the second TFT are connected to the same data line, and the gate of the first TFT and the gate of the second TFT are connected to the same gate line.

A display apparatus is further provided according to the disclosure, which includes any one of the array substrates described above.

In the array substrate and the display apparatus provided according to the disclosure, the array substrate includes multiple pixel units divided by gate lines and data lines arranged crosswise, and each of the pixel units includes a first sub-pixel electrode and a second sub-pixel electrode, which are respectively driven by a first TFT and a second TFT. Specifically, the first sub-pixel electrode is connected to a drain of the first TFT, and the second sub-pixel electrode is connected to a drain of the second TFT. A resistance between a source of the first TFT and the data line connected to the first TFT is greater than a resistance between a source of the second TFT and the data line connected to the second TFT, and/or, a resistance between the drain of the first TFT and the first sub-pixel electrode is greater than a resistance between the drain of the second TFT and the second sub-pixel electrode. It can be seen that, for each pixel unit, since a resistor is connected in series at the source or the drain of the first TFT to divide voltage, an output voltage at the drain of the first TFT is less than an output voltage at the drain of the second TFT under the same drive voltage. Therefore, a voltage difference is generated between the two sub-pixel electrodes respectively connected to the drain of the first TFT and the drain of the second TFT, and deflection angles of liquid crystal molecules within the corresponding liquid crystal regions are changed. In this way, when incident light is transmitted through a liquid crystal region corresponding to one pixel unit, emitted light is substantially maintained uniform in different directions, thereby improving the viewing angle of the liquid crystal display and reducing the complexity of the array substrate structure without adding an additional TFT.

BRIEF DESCRIPTION OF THE DRAWINGS

In order to explain the technical solutions in embodiments of the present disclosure or the related technology more clearly, accompanying drawings of the embodiments or the related art are briefly illustrated hereinafter. Apparently, the accompanying drawings described hereinafter are only some embodiments of the present disclosure, and those skilled in the art can further obtain other drawings based on the drawings without creative work.

DETAILED DESCRIPTION

In the following description, for purposes of explanation and not limitation, specific details such as particular architectures, interfaces, techniques are set forth, in order to provide a thorough understanding of the disclosure. However, it should be apparent to those skilled in the art that the disclosure may be practiced in other illustrative embodiments that depart from these specific details. In other cases, detailed descriptions of well-known devices, circuits and methods are omitted, so as to avoid obscuring the description of the disclosure with unnecessary detail.

Additionally, the term "first" and "second" is only used for description, and cannot be regarded as implying the relative importance or indicating the number of technical features specified in the instructions. As a result, characteristics limited by "first", "second" can express or imply one or more of the characteristics. In the description of the present disclosure, unless otherwise noted, "multiple" means two or more.

An array substrate is provided according to one embodiment of the disclosure, which includes multiple pixel units divided by gate lines and data lines arranged crosswise. Specifically, the embodiment of the disclosure is illustrated with one pixel unit as an example.

Figure 1:
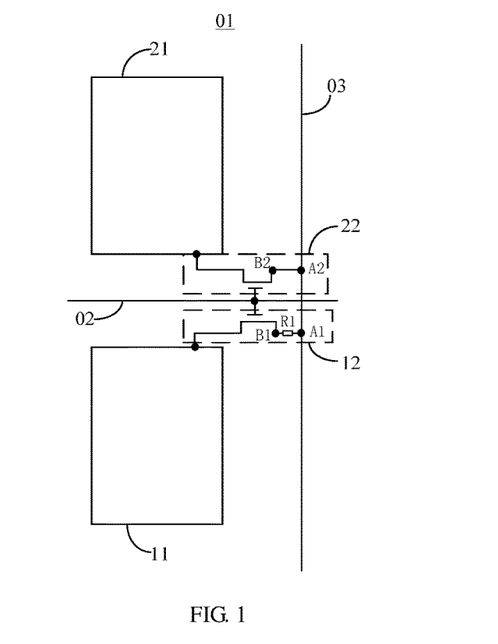
FIG. 1 is a first plan schematic view of a structure of a pixel unit on an array substrate according to one embodiment of the disclosure.
Figure 2:
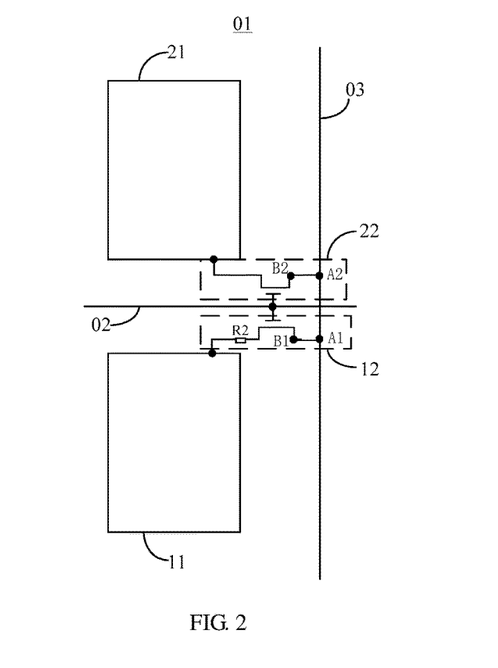
FIG. 2 is a second plan schematic view of a structure of a pixel unit on an array substrate according to one embodiment of the disclosure.

As shown in FIG. 1 or FIG. 2, a pixel unit 01 includes a first sub-pixel electrode 11 and a second sub-pixel electrode 21. The first sub-pixel electrode 11 and the second sub-pixel electrode 21 are respectively driven by a first TFT 12 and a second TFT 22. Specifically, the first sub-pixel electrode 11 is connected to a drain of the first TFT 12, and the second sub-pixel electrode 21 is connected to a drain of the second TFT 22. A gate of the first TFT 12 and a gate of the second TFT 22 both are connected to one gate line 02. A source of the first TFT 12 and a source of the second TFT 22 both are connected to one data line 03.

Of course, the gate of the first TFT 12 and the gate of the second TFT 22 may be connected to different gate lines, and the source of the first TFT 12 and the source of the second TFT 22 may also be connected to different data lines, which are not limited in the disclosure.

A resistance between the source of the first TFT 12 and the data line 03 connected to the first TFT 12 is greater than a resistance between the source of the second TFT 22 and the data line 03 connected to the second TFT 22; and/or, a resistance between the drain of the first TFT 12 and the first sub-pixel electrode 11 is greater than a resistance between the drain of the second TFT 22 and the second sub-pixel electrode 21.

Specifically, as shown in FIG. 1, a first voltage dividing resistor R1 is added between the source of the first TFT 12 and the data line 03 with respect to the source of the second TFT 22. Since the same drive voltage is applied by the data line 03, a voltage at a connecting point A1 between the source of the first TFT 12 and the data line 03 is equal to a voltage at a connecting point A2 between the source of the second TFT 22 and the data line 03 (that is, UA1=UA2).

Then a voltage UB1 at B1 on the source of the first TFT 12 is equal to UA1 minus IR (I is a current value passing through the first voltage dividing resistor R1) after the voltage division by the first voltage dividing resistor R1. The voltage UB2 at B2 on the source of the second TFT 22 is equal to UA1. Therefore, UB2 is greater than UB1. Furthermore, a charging voltage of the first sub-pixel electrode 11 after being charged is identical to or close to the voltage at B1, a charging voltage of the second sub-pixel electrode 21 after being charged is identical to or close to the voltage at B2, and UB2 is greater than UB1, therefore, the charging voltage of the first sub-pixel electrode 11 is less than the charging voltage of the second sub-pixel electrode 21, electric field intensities on the liquid crystal domains corresponding to the two sub-pixel electrodes 11 and 21 are different, and finally deflection angles of liquid crystal molecules within the two domains are different.

In this case, although the liquid crystal molecules still have optical anisotropy, light transmission directions of the two domains are different, and emitted light of the two domains complements each other, which makes the emitted light substantially uniform in all directions. Since a screen is presented at the macro level by the liquid crystal display apparatus due to space integral of the emitted light from each pixel unit, a substantially same screen can be observed from any of a wide range of viewing angles in the embodiment of the disclosure, that is, a viewing angle of the liquid crystal display apparatus is improved while no additional TFT is added to control the charge-discharge of the sub-pixel electrodes.

Optionally, as shown in FIG. 2, a second voltage dividing resistor R2 is added between the drain of the first TFT 12 and the first sub-pixel electrode 11 with respect to the drain of the second TFT 22. Similar to the description above, since the second voltage dividing resistor R2 also has the function of voltage division, under the same drive voltage, a charging voltage at the drain of the first TFT 12 is less than a charging voltage at the drain of the second TFT 22, electric field intensities at the liquid crystal domains corresponding to the two sub-pixel electrodes 11 and 21 are different, and finally deflection angles of liquid crystal molecules within the two domains are different.

It should be noted that, similar to the principle of voltage division described above, the first voltage dividing resistor R1 may also be added between the source of the first TFT 12 and the data line 03, while the second voltage dividing resistor R2 may added between the drain of the first TFT 12 and the first sub-pixel electrode 11, therefore, electric field intensities at the liquid crystal domains corresponding to the two sub-pixel electrodes 11 and 21 are different, and finally deflection angles of liquid crystal molecules within the two domains are different.

Furthermore, the source of the first TFT 12 can be connected to the data line 03 through a source line in a broken line shape, and the source of the second TFT 22 is connected to the data line 03 through a source line in a straight line shape, thereby increasing the resistance between the source of the first TFT 12 and the data line 03, and further forming the first voltage dividing resistor R1.

Similarly, the drain of the first TFT 12 can also be connected to the first sub-pixel electrode 11 through a drain line in a broken line shape, and the drain of the second TFT 22 is connected to the second sub-pixel electrode 21 through a drain line in a straight line shape, thereby increasing the resistance between the drain of the first TFT 12 and the first sub-pixel electrode 11, and further forming the second voltage dividing resistor R2.

Figure 3:
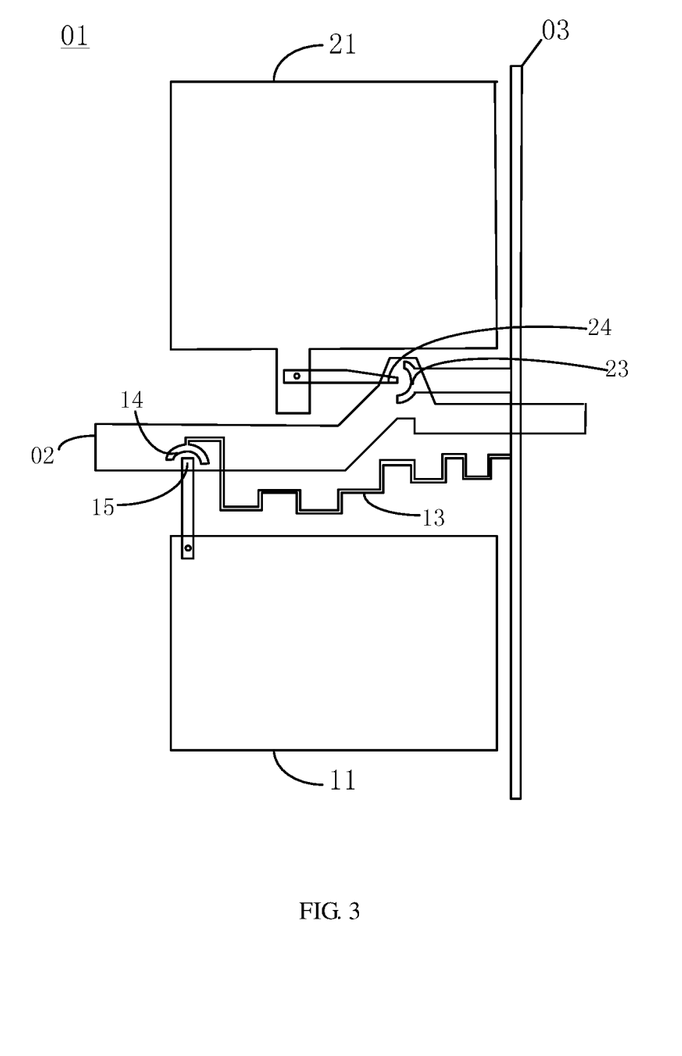
FIG. 3 is a third plan schematic view of a structure of a pixel unit on an array substrate according to one embodiment of the disclosure.

Illustratively, as shown in FIG. 3, the source of the first TFT 12 is connected to the data line 03 through a source line in a broken line shape as an example. The pixel unit 01 specifically includes a first sub-pixel electrode 11 and a second sub-pixel electrode 21. The first sub-pixel electrode 11 and the second sub-pixel electrode 21 are respectively located at both sides of one gate line 02 and at the same side of one data line 03. The gate line 02 is directly used as the gates of the two TFTs. The first TFT and the data line 03 are connected through a source line 13, which is designed in the broken line shape, extending from the data line 03 to the first sub-pixel electrode 11 and forming a first source 14 on the gate line 02. The second TFT and the data line 03 are connected through a source line in a straight line shape, extending from the data line 03 to the second sub-pixel electrode 21 and forming a second source 23 on the gate line 02. A first drain 15 and a second drain 24 respectively corresponding to the first source 14 and the second source 23 are formed. The first drain 15 is electrically connected to the first sub-pixel electrode 11 through a via hole, and the second drain 24 is electrically connected to the second sub-pixel electrode 21 through a via hole.

In this way, since the first voltage dividing resistor R1 is formed of the source line 13 of the first TFT in a broken line shape, which has the function of voltage division, under the same drive voltage, an output voltage at the first drain 15 of the first TFT is less than an output voltage at the second drain 24 of the second TFT, and a voltage difference is generated between the two sub-pixel electrodes respectively connected to the drain of the first TFT and the drain of the second TFT.

Of course, similar to the pixel unit 01 as shown in FIG. 3, the drain of the first TFT 12 may also be connected to the first sub-pixel electrode 11 through a drain line in a broken line shape. Specifically, referring to FIG. 3, similar to the source line 13 connected to the first TFT 12, the drain line connected to the first drain 15 in the first TFT 12 can be designed in a broken line shape, forming the second voltage dividing resistor R2. Thus, since the second voltage dividing resistor R2 also has the function of voltage division, a voltage difference can be generated between the two sub-pixel electrodes respectively connected to the drain of the first TFT and the drain of the second TFT.

It should be noted that the connection, shape and type of the TFT are not especially limited in the disclosure. For example, the connection between the two TFTs can be in a form that the two sources are connected back to back and the two corresponding drains are arranged at both sides of the two sources connected back to back, or, the two sources are arranged side by side and the two corresponding drains are arranged at the same side of the two sources. The TFT can be an I-type TFT whose source is elongated, or a U-type TFT whose source is in a U-shape. Those skilled in the art can select the most appropriate connection, shape and type of the TFT depending on actual circumstances.

As a development to the embodiments described above, as shown in FIG. 4, a non-penetrated groove 41 can be arranged in the gate line 02. In one embodiment, the groove 41 extends along a direction from the second sub-pixel electrode 21 to the first sub-pixel electrode 11 and does not penetrate the gate line 02. An opening of the groove 41 faces towards the first sub-pixel electrode 11 or the second sub-pixel electrode 21. A portion of the source line 13 of the first TFT passing through a bottom of the groove 41 is overlapped with the gate of the first TFT, and other portions of the source line 13 of the first TFT are not overlapped with the gate of the first TFT, so that the overlapping area between the gate line 02 and the source line 13 of the first TFT is reduced. Thus, interferences of a coupling capacitance between the gate line 02 and the source line 13 can be reduced.

Furthermore, in another implementation according to one embodiment of the disclosure, first source segments spaced apart from each other and second source segments arranged in a different layer from the first source segments are specifically included between the source of the first TFT and the data line connected to the first TFT. The second source segments are connected to the first source segments spaced apart from each other through via holes, and the source of the second TFT is arranged in the same layer with the first source segments or with the second source segments.

Figure 4:
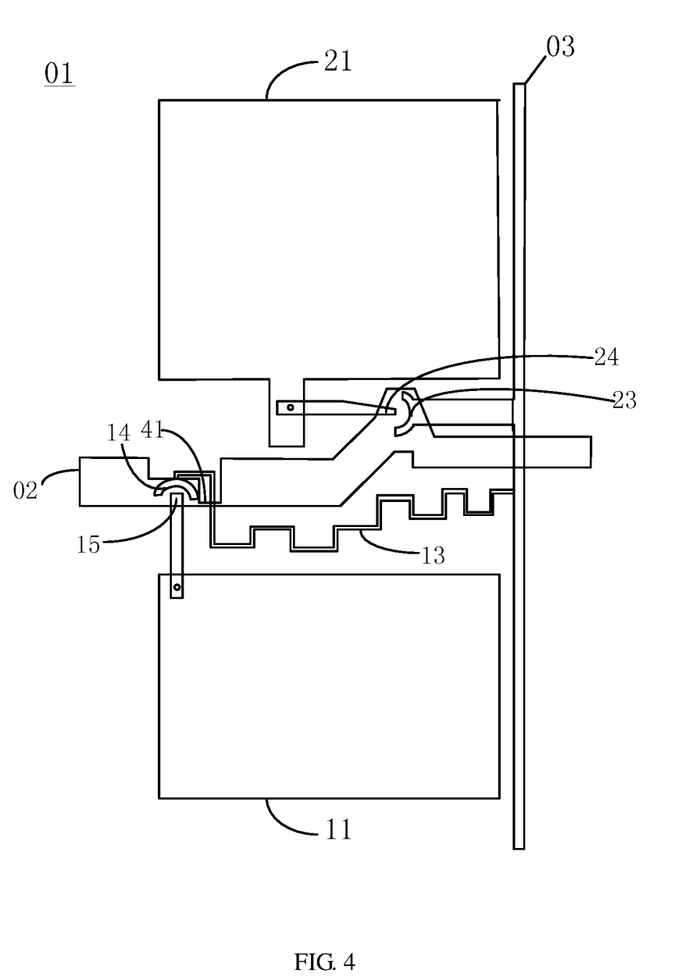
FIG. 4 is a fourth plan schematic view of a structure of a pixel unit on an array substrate according to one embodiment of the disclosure.
Figure 5:
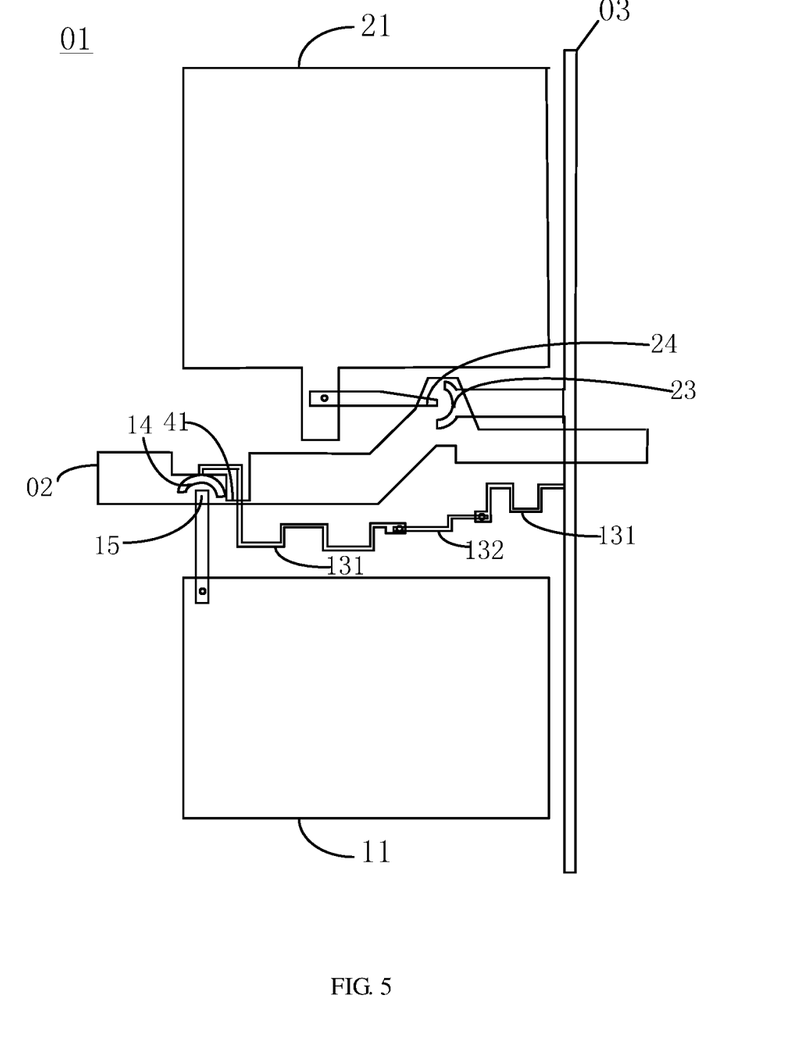
FIG. 5 is a fifth plan schematic view of a structure of a pixel unit on an array substrate according to one embodiment of the disclosure.

Illustratively, as shown in FIG. 5, one or more interruptions are arranged in the source line 13 of the first TFT on the basis of the structure of the pixel unit as shown in FIG. 4. In this case, first source segments 131 spaced apart from each other and second source segments 132 arranged in a different layer from the first source segments are specifically included between the source 14 of the first TFT and the data line 03. The second source segments 132 are complementarily connected to the first source segments 131 spaced apart from each other through via holes. In this embodiment, the pixel unit 01 is arranged by using the gate line 02 as a middle line, the two sub-pixel electrodes 11 and 21 both are adjacent to the gate line 02 and the data line 03, and the gate line 02 is directly used as the gates of the two TFTs, which can minimize connection lines (such as a line between the gate and the gate line, a line between the data line and the source, and a line between the sub-pixel electrode and the drain) and simplify patterning processes of functional layers.

The second source segment 132 can specifically be an ITO resistor made of an ITO material, and thus the second source segment 132 can be arranged in a same layer with the first sub-pixel electrode 11 and/or the second sub-pixel electrode 21, which does not increase the number of the patterning processes used in fabricating the array substrate.

Of course, the second source segment 132 may also be made of other materials which have a larger resistance, and the second source segment 132 is arranged in a different layer from the first sub-pixel electrode 11 and/or the second sub-pixel electrode 21. Therefore, after the sources and the drains of the first TFT and the second TFT are formed, the second source segment 132 is complementarily connected to the first source segments 131 spaced apart by separately using the patterning process one time.

It should be noted that, similar to the pixel unit 01 as shown in FIG. 4, first drain segments spaced apart and second drain segments arranged in a different layer from the first drain segments can be arranged between the drain of the first TFT and the first sub-pixel electrode, thereby forming the second voltage dividing resistor R2. Thus, since the second voltage dividing resistor R2 also has the function of voltage division, a voltage difference can be generated between the two sub-pixel electrodes respectively connected to the drain of the first TFT and the drain of the second TFT.

Optionally, in another implementation according to one embodiment of the disclosure, a diode pair, a first source segment, and a second source segment can be specifically included between the source of the first TFT and the data line connected to the first TFT. One end of the diode pair is connected to the first source segment, and the other end of the diode pair is connected to the second source segment. Since the diode has conductivity in one direction, the diode pair includes a forward diode and a backward diode connected in parallel, in order to ensure that the first TFT can be turned on when a high voltage or a low voltage is supplied by the data line.

Furthermore, there are several methods for forming the above diode pair, and illustratively, the diode pair formed by shorting the two TFTs is illustrated according to the embodiment.

Figure 6:
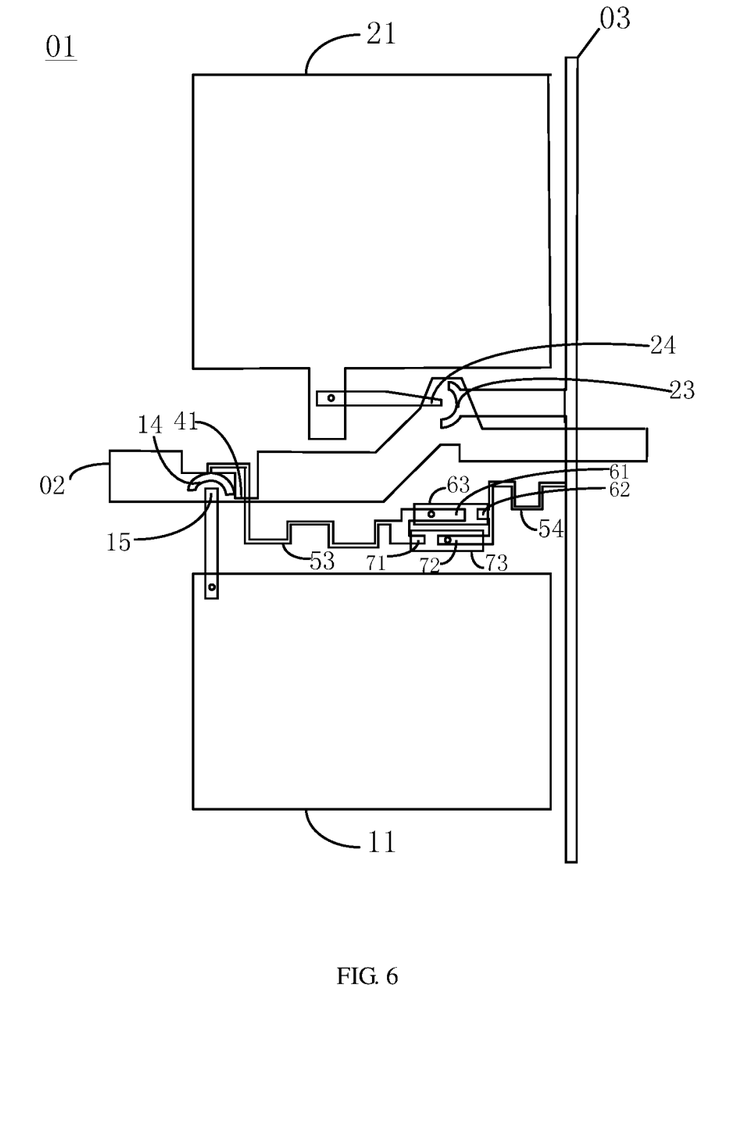
FIG. 6 is a sixth plan schematic view of a structure of a pixel unit on an array substrate according to one embodiment of the disclosure.

In this case, as shown in FIG. 6, the diode pair is composed of the forward diode and the backward diode, one end of the diode pair is connected to a first source segment 53, and the other end of the diode pair is connected to a second source segment 54. The forward diode includes a first shorted source 61, a first shorted drain 62 and a first gate region 63 (the first gate region 63 is arranged in a same layer with the gate of the first TFT). The first shorted source 61 is connected to the first source segment 53. The first shorted drain 62 is connected to the second source segment 54. The first gate region 63 is shorted to the first shorted source 61 through a via hole. The backward diode includes a second shorted source 71, a second shorted drain 72 and a second gate region 73 (the second gate region 73 is arranged in a same layer with the gate of the second TFT). The second shorted source 71 is connected to the first source segment 53, the second shorted drain 72 is connected to the second source segment 54, and the second gate region 73 is shorted to the second shorted drain 72 through a via hole.

Figure 7:
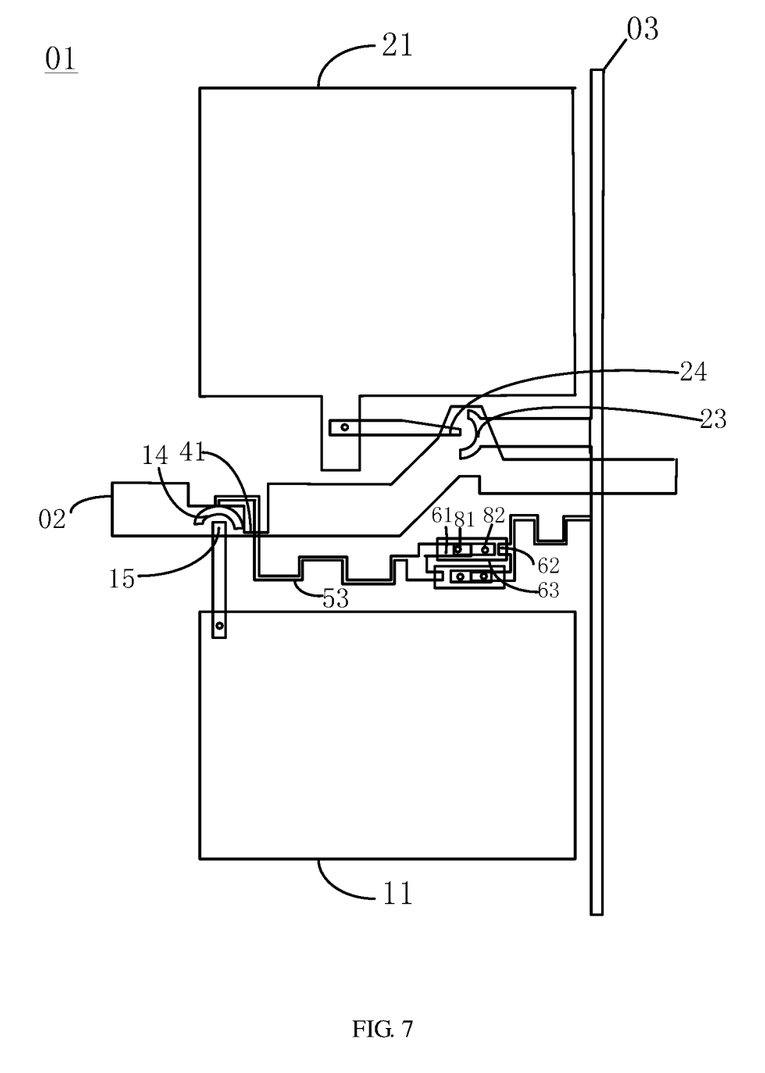
FIG. 7 is a seventh plan schematic view of a structure of a pixel unit on an array substrate according to one embodiment of the disclosure.

Corresponding to FIG. 6, there can be several methods for forming the forward diode and the backward diode by shorting the TFT, and those skilled in the art can select the most appropriate arrangement depending on actual circumstances. For example, as shown in FIG. 7, an ITO layer is arranged on the forward diode and the backward diode, the ITO layer is electrically connected to the first shorted source 61 through a via hole 81, and the ITO layer is electrically connected to the first gate region 63 through a via hole 82, so as to short the first gate region 63 and the first shorted source 61, thereby forming the forward diode. Correspondingly, the backward diode can be formed by using the method described above. Thus, the first voltage dividing resistor R1 can be formed at the source of the first TFT without additionally increasing the number of the pattern processes used in fabricating the array substrate.

It should be noted that the same method described above can be used for the drain of the first TFT, the forward diode and the backward diode are formed at the drain 15 of the first TFT, thereby forming the second voltage dividing resistor R2. Thus, since the second voltage dividing resistor R2 also has the function of voltage division, the generation of a voltage difference between the two sub-pixel electrodes respectively connected to the drain of the first TFT and the drain of the second TFT is guaranteed.

Furthermore, since the TFT can be equivalent to a resistor in the on-state (when a voltage is applied to the gate to make an active layer conductive), in this case, a resistance of the TFT is determined by a width to length ratio of the TFT. The width to length ratio is an inherent attribute and is generally written as W/L, where W and L respectively represent a width and length of a channel. As shown in Formula (1), a width to length ratio $W_1/L_1$ of the TFT is related to the resistance of the TFT, that is, $$1/R_{on} = \partial I/\partial V = \mu_n C_{ox}(V_{GS1} - V_{th1})W_1/L_1 \quad (1)$$

where $R_{on}$ is a resistance of the TFT being turned on, $V_{GS1}$ is a potential difference between the gate and the source, and $V_{th1}$ is an initially stimulated voltage of a conduction band of a semiconductor layer applied by charges, i.e. a threshold voltage. $C_{ox} = \varepsilon_0 \varepsilon_{ox}/d_{ox}$, where $C_{ox}$ is a unit-area capacitance of a gate insulating layer, $\varepsilon_0$ is a dielectric constant of a vacuum, $\varepsilon_{ox}$ is a dielectric constant of the gate insulating layer, and $d_{ox}$ is a thickness of the gate insulating layer. $\mu_n$ is electron mobility of the semiconductor. It can be seen from the formula, the resistance of the TFT being turned on is inversely proportional to the width to length ratio $W_1/L_1$.

Since the forward diode or the backward formed by shorting the TFTs still have the above-described characteristic, the resistance of the forward diode or the backward diode can be controlled by adjusting the width to length ratio W1/L1 of the forward diode or the backward diode, and further the resistance of the dividing resistor is controlled. Therefore, the electric field intensities subjected to the liquid crystal domains corresponding to the two sub-pixel electrodes are different, and finally the deflection angles of liquid crystal molecules within the two domains are different, which makes the emitted light maintain uniform in all directions and improves the viewing angle characteristic of the liquid crystal display apparatus.

It should be noted that, the first voltage dividing resistor is added between the data line and the source of the first TFT with respect to the source of the second TFT, which is illustrated in the above-described embodiments. It should be appreciated that, a design scheme that the second voltage dividing resistor is added between the first sub-pixel electrode and the drain of the first TFT with respect to the drain of the second TFT is similar to the related scheme in the above-described embodiments, which is not repeated any more here.

Furthermore, the difference between the charging voltage of the first sub-pixel electrode and the charging voltage of the second sub-pixel electrode in the same pixel unit can be selected within the range of 0 to 0.5V, in order to make the emitted light maintain uniform in all directions as far as possible. The difference makes the corresponding two liquid crystal domains have an optimized difference of the deflection angles, which can further make the emitted light more uniform in all directions. Therefore, a more consistent screen is obtained in all macroscopic directions, and the viewing angle characteristic of the liquid crystal display apparatus is improved.

It can be understood that, the charging voltage difference between the two sub-pixel electrodes in the same pixel unit is not particularly limited in the disclosure. Even if the above difference is set within other ranges, which still fall into the protective scope of the disclosure as long as the emitted light can be maintained uniform in all directions.

It should be further noted that the objective of the above-described embodiments is to provide a more optimized design idea for components of the array substrate. The location and connection type of the TFTs and the sub-pixel electrodes are not limited in the disclosure, and those skilled in the art can select the most appropriate arrangement depending on actual circumstances.

A display apparatus is further provided according to one embodiment of the disclosure, which includes any one of the array substrates described above. The display apparatus can be a product or a component which has a display function, such as a liquid crystal panel, an electronic paper, an OLED panel, a mobile phone, a tablet computer, a television, a monitor, a notebook computer, a digital picture frame, and a navigation.

It should be noted that the array substrate included in the display apparatus according to the disclosure is not limited to any one of the above-described embodiments, and variations and combinations can be made to the above-described embodiments by those skilled in the art depending on actual circumstances, to fabricate the liquid crystal display apparatus which has good viewing angle characteristic and is suitable for production and use.

The array substrate and the display apparatus are provided according to the embodiments of the disclosure. The array substrate includes multiple pixel units divided by gate lines and data lines arranged crosswise, and each of the pixel units includes a first sub-pixel electrode and a second sub-pixel electrode, which are respectively driven by a first TFT and a second TFT. Specifically, the first sub-pixel electrode is connected to a drain of the first TFT, and the second sub-pixel electrode is connected to a drain of the second TFT. A resistance between a source of the first TFT and the data line connected to the first TFT is greater than a resistance between a source of the second TFT and the data line connected to the second TFT, and/or, a resistance between the drain of the first TFT and the first sub-pixel electrode is greater than a resistance between the drain of the second TFT and the second sub-pixel electrode. It can be seen that, for each pixel unit, since a voltage dividing resistor is arranged at the source or the drain of the first TFT to divide voltage, an output voltage at the drain of the first TFT is less than an output voltage at the drain of the second TFT under the same drive voltage. Therefore, a voltage difference is generated between the two sub-pixel electrodes respectively connected to the drain of the first TFT and the drain of the second TFT, and deflection angles of liquid crystal molecules within the corresponding liquid crystal regions are changed. In this way, when incident light is transmitted through a liquid crystal region corresponding to one pixel unit, emitted light is substantially maintained uniform in different directions, thereby improving the viewing angle of the liquid crystal display and reducing the complexity of the array substrate structure without adding an additional TFT.

In the description of the disclosure, specific features, structures, materials, or characteristics can be combined in any one or more embodiments or examples in a suitable way.

The foregoing description is merely illustrative of particular embodiments of the disclosure, but the scope of the disclosure is not limited thereto, and any variations or substitutions which can readily occur to those skilled in the art without departing from the spirit of the disclosure will fall into the scope of the disclosure as defined in the appended claims.

The invention claimed is:

1. An array substrate, comprising: a plurality of pixel units divided by gate lines and data lines arranged crosswise, wherein
   each of the pixel units comprises a first sub-pixel electrode, a second sub-pixel electrode, a first TFT, and a second TFT; the first sub-pixel electrode is connected to a drain of the first TFT, and the second sub-pixel electrode is connected to a drain of the second TFT;
   a resistance between a source of the first TFT and the data line connected to the first TFT is greater than a resistance between a source of the second TFT and the data line connected to the second TFT; and/or, a resistance between the drain of the first TFT and the first sub-pixel electrode is greater than a resistance between the drain of the second TFT and the second sub-pixel electrode,
   wherein the source of the first TFT is connected to the data line connected to the first TFT through a source line in a broken line shape, and the source of the second TFT is connected to the data line connected to the second TFT through a source line in a straight line shape; and/or the drain of the first TFT is connected to the first sub-pixel electrode through a drain line in a broken line shape, and the drain of the second TFT is connected to the second sub-pixel electrode through a drain line in a straight line shape.

2. The array substrate according to claim 1, further comprising
a first voltage dividing resistor in the source line connected to the source of the first TFT, and/or,
a second voltage dividing resistor in the drain line connected to the drain of the first TFT.

3. The array substrate according to claim 2, wherein when the first voltage dividing resistor is in the source line connected to the source of the first TFT, the source line connected to the source of the first TFT comprises first source segments spaced apart from each other, and the first voltage dividing resistor comprises second source segments in a different layer from the first source segments;
the second source segments are connected to the first source segments spaced apart from each other through via holes; and the source of the second TFT is in a same layer with the first source segments or the second source segments.

4. The array substrate according to claim 3, wherein the second source segments are in the same layer with the first sub-pixel electrode and/or the second sub-pixel electrode.

5. The array substrate according to claim 2, wherein when the first voltage dividing resistor is in the source line connected to the source of the first TFT, the source line connected to the source of the first TFT comprises a first source segment and a second source segment, and the first voltage dividing resistor comprises a diode pair;
one end of the diode pair is connected to the first source segment, and the other end of the diode pair is connected to the second source segment; and the diode pair comprises a forward diode and a backward diode connected in parallel.

6. The array substrate according to claim 5, wherein the forward diode and the backward diode are formed by shorting a thin film transistor, respectively;
the forward diode comprises a first shorted source, a first shorted drain and a first gate region, the first shorted source is connected to the first source segment, the first shorted drain is connected to the second source segment, and the first gate region is shorted to the first shorted source through a via hole; and
the backward diode comprises a second shorted source, a second shorted drain and a second gate region, the second shorted source is connected to the first source segment, the second shorted drain is connected to the second source segment, and the second gate region is shorted to the second shorted drain through a via hole.

7. The array substrate according to claim 6, wherein the first gate region and the second gate region are in a same layer with a gate of the first TFT and a gate of the second TFT, respectively.

8. The array substrate according to claim 6, wherein
via holes are respectively formed in the first gate region and the first shorted source, and the two via holes are connected by covering a transparent conducting layer on the two via holes; and
via holes are respectively formed in the second gate region and the second shorted drain, and the two via holes are connected by covering a transparent conducting layer on the two via holes.

9. The array substrate according to claim 3, wherein when the second voltage dividing resistor is in the drain line connected to the drain of the first TFT, the drain line connected to the drain of the first TFT comprises first drain segments spaced apart from each other, the second voltage dividing resistor comprises second drain segments in a different layer from the first source segments, and the second drain segments are connected to the first drain segments spaced apart through via holes.

10. The array substrate according to claim 1, wherein a non-penetrated groove is arranged in the gate line, an opening of the groove faces towards the first sub-pixel electrode or the second sub-pixel electrode, and the source line of the first TFT is overlapped with a gate of the TFT by passing through a bottom of the groove.

11. The array substrate according to claim 10, wherein the groove extends in a direction from the second sub-pixel electrode to the first sub-pixel electrode and does not penetrate the gate line.

12. The array substrate according to claim 1, wherein in one of the pixel units, the source of the first TFT and the source of the second TFT are connected to the same data line, and the gate of the first TFT and the gate of the second TFT are connected to the same gate line.

13. A display apparatus, comprising: the array substrate according to claim 1.

14. An array substrate, comprising: a plurality of pixel units divided by gate lines and data lines arranged crosswise, wherein
each of the pixel units comprises a first sub-pixel electrode, a second sub-pixel electrode, a first TFT, and a second TFT; the first sub-pixel electrode is connected to a drain of the first TFT, and the second sub-pixel electrode is connected to a drain of the second TFT;
a resistance between a source of the first TFT and the data line connected to the first TFT is greater than a resistance between a source of the second TFT and the data line connected to the second TFT; and/or, a resistance between the drain of the first TFT and the first sub-pixel electrode is greater than a resistance between the drain of the second TFT and the second sub-pixel electrode,
the array substrate further comprises:
a first voltage dividing resistor in a source line connected to the source of the first TFT, and/or,
a second voltage dividing resistor in a drain line connected to the drain of the first TFT,
wherein when the first voltage dividing resistor is in the source line connected to the source of the first TFT, the source line connected to the source of the first TFT comprises first source segments spaced apart from each other, and the first voltage dividing resistor comprises second source segments in a different layer from the first source segments;
the second source segments are connected to the first source segments spaced apart from each other through via holes; and the source of the second TFT is in a same layer with the first source segments or the second source segments.

15. The array substrate according to claim 14, wherein the second source segments are in the same layer with the first sub-pixel electrode and/or the second sub-pixel electrode.

16. The array substrate according to claim 14, wherein when the second voltage dividing resistor is in the drain line connected to the drain of the first TFT, the drain line connected to the drain of the first TFT comprises first drain segments spaced apart from each other, the second voltage dividing resistor comprises second drain segments in a different layer from the first source segments, and the second drain segments are connected to the first drain segments spaced apart through via holes.

17. An array substrate, comprising: a plurality of pixel units divided by gate lines and data lines arranged crosswise, wherein
each of the pixel units comprises a first sub-pixel electrode, a second sub-pixel electrode, a first TFT, and a second TFT; the first sub-pixel electrode is connected to a drain of the first TFT, and the second sub-pixel electrode is connected to a drain of the second TFT;
a resistance between a source of the first TFT and the data line connected to the first TFT is greater than a resistance between a source of the second TFT and the data line connected to the second TFT; and/or, a resistance between the drain of the first TFT and the first sub-pixel electrode is greater than a resistance between the drain of the second TFT and the second sub-pixel electrode, the array substrate further comprises:
a first voltage dividing resistor in a source line connected to the source of the first TFT, and/or,
a second voltage dividing resistor in a drain line connected to the drain of the first TFT,
wherein when the first voltage dividing resistor is in the source line connected to the source of the first TFT, the source line connected to the source of the first TFT comprises a first source segment and a second source segment, and the first voltage dividing resistor comprises a diode pair;
one end of the diode pair is connected to the first source segment, and the other end of the diode pair is connected to the second source segment; and the diode pair comprises a forward diode and a backward diode connected in parallel.

18. The array substrate according to claim 17, wherein the forward diode and the backward diode are formed by shorting a thin film transistor, respectively;
the forward diode comprises a first shorted source, a first shorted drain and a first gate region, the first shorted source is connected to the first source segment, the first shorted drain is connected to the second source segment, and the first gate region is shorted to the first shorted source through a via hole; and
the backward diode comprises a second shorted source, a second shorted drain and a second gate region, the second shorted source is connected to the first source segment, the second shorted drain is connected to the second source segment, and the second gate region is shorted to the second shorted drain through a via hole.

19. The array substrate according to claim 17, wherein the first gate region and the second gate region are in a same layer with a gate of the first TFT and a gate of the second TFT, respectively.

20. The array substrate according to claim 17, wherein
via holes are respectively formed in the first gate region and the first shorted source, and the two via holes are connected by covering a transparent conducting layer on the two via holes; and
via holes are respectively formed in the second gate region and the second shorted drain, and the two via holes are connected by covering a transparent conducting layer on the two via holes.

* * * * *